(12) United States Patent
Abraham et al.

(10) Patent No.: US 10,181,176 B2
(45) Date of Patent: Jan. 15, 2019

(54) EFFICIENT LOW-POWER TEXTURE CACHE ARCHITECTURE

(71) Applicant: Samsung Electronics Co., Ltd., Suwon-si, Gyeonggi-do (KR)

(72) Inventors: Santosh Abraham, Pleasanton, CA (US); Karthik Ramani, San Jose, CA (US); Woong Seo, Suwon-si (KR); Kwontaek Kwon, Suwon-si (KR); Jeongae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/420,463

(22) Filed: Jan. 31, 2017

(65) Prior Publication Data
US 2017/0256025 A1    Sep. 7, 2017

Related U.S. Application Data

(60) Provisional application No. 62/303,889, filed on Mar. 4, 2016.

(51) Int. Cl.
| | |
|---|---|
| *G06T 1/60* | (2006.01) |
| *H04N 19/426* | (2014.01) |
| *H04N 19/44* | (2014.01) |
| *G06T 15/04* | (2011.01) |
| *G06T 15/00* | (2011.01) |

(52) U.S. Cl.
CPC ............ *G06T 1/60* (2013.01); *G06T 15/005* (2013.01); *G06T 15/04* (2013.01); *H04N 19/426* (2014.11); *H04N 19/44* (2014.11); *Y02D 10/13* (2018.01)

(58) Field of Classification Search
CPC combination set(s) only.
See application file for complete search history.

(56) References Cited

U.S. PATENT DOCUMENTS

| | | | |
|---|---|---|---|
| 6,339,428 B1 * | 1/2002 | Fowler | .............. G06T 15/04 345/582 |
| 7,151,544 B2 | 12/2006 | Emberling | |
| 7,242,811 B2 | 7/2007 | Fenney | |
| 7,649,538 B1 * | 1/2010 | Minkin | .............. G06T 1/60 345/428 |
| 7,791,612 B2 | 9/2010 | Munshi | |
| 7,948,498 B1 | 5/2011 | Minkin | |
| 7,965,296 B2 | 6/2011 | Xu et al. | |
| 8,605,104 B1 | 12/2013 | McAllister et al. | |

(Continued)

FOREIGN PATENT DOCUMENTS

WO    2015/200137    12/2015

OTHER PUBLICATIONS

Jonathan Blow "Implementing a Texture Caching System", Game Developer, Apr. 1998.

(Continued)

*Primary Examiner* — Wesner Sajous
(74) *Attorney, Agent, or Firm* — Lewis Roca Rothgerber Christie LLP

(57) ABSTRACT

A texture cache architecture includes a first texture cache to store compressed texel data and a second texture cache to store decompressed texel data. A controller schedules accesses to access texel data from the first or second texture cache. The second texture cache permits decompressed texel data to be reused for more than one texel access request.

18 Claims, 13 Drawing Sheets

(56) References Cited

U.S. PATENT DOCUMENTS

| | | |
|---|---|---|
| 8,711,164 B2 | 4/2014 | Dye |
| 8,923,636 B2 | 12/2014 | Furihata et al. |
| 8,942,496 B2 | 1/2015 | Seki et al. |
| 9,117,285 B2 | 8/2015 | Clemie et al. |
| 9,129,543 B2 | 9/2015 | Strom et al. |
| 9,143,780 B1 | 9/2015 | Lewis et al. |
| 9,158,686 B2 | 10/2015 | Wegener |
| 9,159,114 B2 | 10/2015 | Dewangan et al. |
| 9,189,394 B2 | 11/2015 | Kim |
| 9,232,221 B2 | 1/2016 | Lee et al. |
| 9,378,560 B2 | 6/2016 | Iourcha et al. |
| 2003/0169263 A1 | 9/2003 | Lavelle et al. |
| 2004/0239680 A1 | 12/2004 | Emberling |
| 2010/0118043 A1* | 5/2010 | Minkin ............ G06T 1/60 345/582 |
| 2011/0292065 A1* | 12/2011 | Minkin ............ G06T 15/04 345/582 |
| 2012/0212498 A1 | 8/2012 | Dye |
| 2012/0281915 A1 | 11/2012 | Strom |
| 2014/0369614 A1 | 12/2014 | Fenney |
| 2015/0379684 A1 | 12/2015 | Ramani et al. |
| 2016/0027145 A1 | 1/2016 | Taylor et al. |
| 2016/0078666 A1* | 3/2016 | Park ............ G06T 1/60 345/426 |
| 2016/0140688 A1* | 5/2016 | Lee ............ G06T 9/00 345/426 |

OTHER PUBLICATIONS

Ziyad S. Hakura et al. "The Design and Analysis of a Cache Architecture for Texture Mapping", 24th International Symposium on Computer Architecture, 1997.

Mike Houston et al. "Compression in the Graphics Pipeline", Computer Science Department, Stanford University, Published Dec. 14, 2001.

Homan Igehy et al. "Parallel Texture Caching", Proceedings of the 1999 Eurographics/SIGGRAPH Workshop on Graphics Hardware, Jun. 1999.

Homan Igehy et al. "Prefetching in a Texture Cache Architecture" Proceedings of the 1998 Eurographics/SIGGRAPH Workshop on Graphics Hardware, Aug. 1, 1998.

Tetsugo Inada et al. "Compressed Lossless Texture Representation and Caching", Sep. 15, 2006.

Alaa R. Alameldeen "Adaptive Cache Compression for High-Performance Processors", $31^{st}$ Annual International Symposium on Computer Architecture, Jun. 19, 2004.

U.S. Notice of Allowance dated Mar. 19, 2018, issued in U.S. Appl. No. 15/420,459 (12 pages).

* cited by examiner

FIG. 6 case1. | 1 | 2 | 3 | 4 | case2. | 1 | 2 |
       | 3 | 4 | case3. | 1 | 2 | 3 | case4. | 1 | 2 | case5. | 1 | case6. | 1 |
       | 2 |

FIG. 9

EFFICIENT LOW-POWER TEXTURE CACHE ARCHITECTURE

CROSS REFERENCE TO RELATED APPLICATIONS

The present application claims the benefit of U.S. Provisional Application No. 62/303,889 filed Mar. 4, 2016, the contents of which are hereby incorporated by reference.

FIELD OF THE INVENTION

An embodiment of the present invention is generally related to techniques of using texture caches in a graphics processing unit.

BACKGROUND OF THE INVENTION

In a graphics system, textures are typically stored in a compressed format in a texture cache. For example, a block compressed format may compress color and alpha for a 4×4 block of pixels into 64 bits (64b; 8 bytes (8B)). After decompression, there is 2B of red, green, and blue (RGB) components with 5, 6, 5 bits per component, respectively. Thus, this compression format achieves a compression factor of 4 (e.g., for a 4×4 blocks of pixels, 2B/pixel*16 pixels)/8B=4).

The compressed format saves on memory requirements as well as the bandwidth required to move the texture between the multiple levels of the memory hierarchy. However, there many drawbacks and limitations associated with conventional texture caching approaches.

BRIEF DESCRIPTION OF THE DRAWINGS

FIG. 4 illustrates an example of cache data and tag mapping in accordance with an embodiment.

FIG. 5 illustrates an example of cache data and tag mapping with conflict free access in accordance with an embodiment.

FIG. 6 illustrates an example of cache access for a 3×3 footprint of a quad in accordance with an embodiment.

FIG. 9 an example of ASTC texel footprint patterns in accordance with an embodiment.

DETAILED DESCRIPTION

Figure 1A:
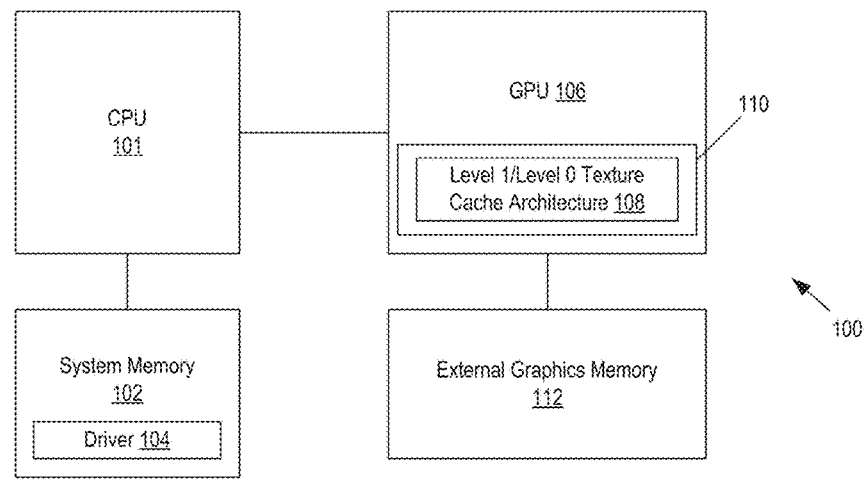
FIG. 1A is a block diagram of a graphics processing system including a texture cache architecture in accordance with an embodiment of the present invention.

FIG. 1A is a block diagram illustrating a graphics system 100 in accordance with an embodiment. In one embodiment, a texture cache unit 110 is part of a graphics processing unit (GPU) 106. In one embodiment, the texture cache unit 110 includes a texture cache architecture, which is described below in more detail in regards to FIG. 1B.

In one embodiment, the GPU 106 may include graphics hardware and implement a graphics pipeline including, for example, one or more shader cores. An external graphics memory 112 may be provided to store additional texture data. In one embodiment, a central processing unit (CPU) 101 and associated system memory 102 may include computer program instructions for driver software 104. Buses may be used to communicatively couple the CPU 101 to the GPU 106, to couple the system memory 102 to the CPU 100, and to couple the GPU 106 to the external graphics memory 112.

Figure 1B:
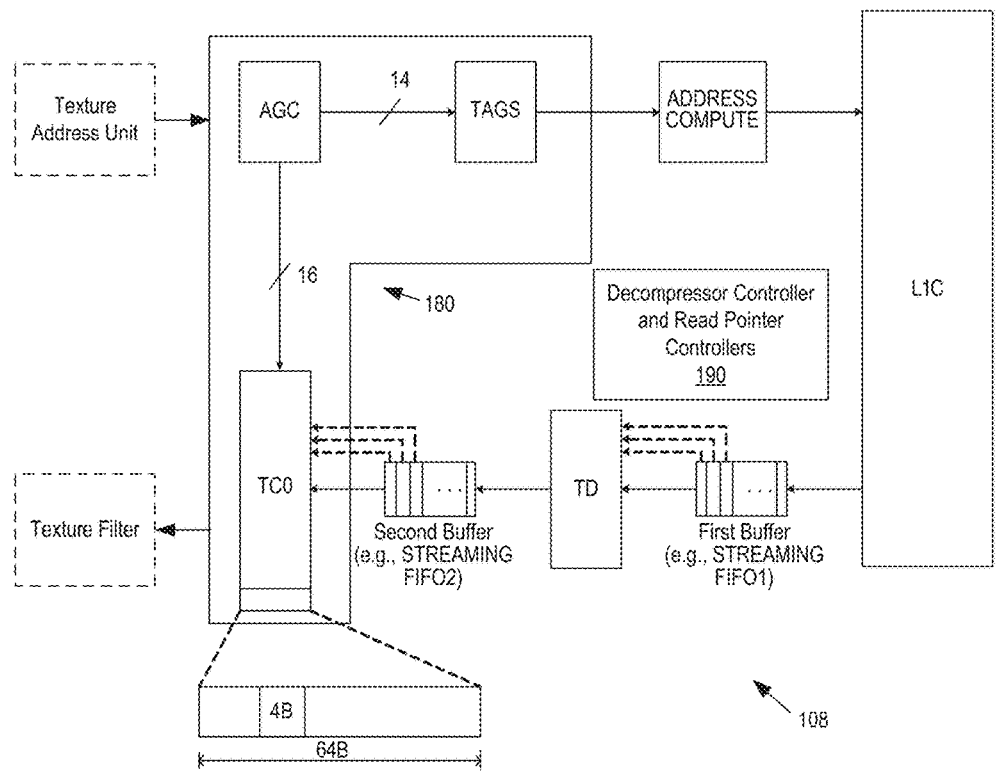
FIG. 1B illustrates the texture cache architecture of FIG. 1A in more detail in accordance with an embodiment of the present invention.

FIG. 1B illustrates an embodiment of the texture cache architecture 108 in more detail. A level 0 texture cache (TC0) is provided for uncompressed texture data (e.g., texel data). In one embodiment, the TC0 cache holds decompressed texels organized into 64B cache lines, where each 4B segment is stored in a separate data bank with the entire cache-line stored across 16 data banks. However, it will be understood that other cache line sizes and segment sizes may be used. A level 1 texture cache (L1C) is provided for compressed texture data (e.g., texel data).

A texture decompressor (TD) is disposed between the TC0 and the L1C. First and second buffers are provided to buffer data. While the buffers may be implemented in different ways, in one embodiment these buffers are implemented as streaming First-in, First Out (FIFOs), including an implementation in which the first buffer is a first FIFO (Streaming FIFO1) and the second buffer is a second FIFO (Streaming FIFO2). Streaming FIFO1 buffers compressed data from the L1C into the TD. Streaming FIFO2 buffers decompressed data provided from the TD into TC0. In one embodiment, while the Streaming FIFOs use a FIFO replacement scheme of always replacing the oldest entry with the new incoming entry, the Streaming FIFO permits read access to any entry, not just the oldest entry as in a regular FIFO.

In one embodiment, a Texture Address Unit (shown in phantom in FIG. 1B) generates a set of accesses for a quad (group of four pixels) and delivers it to the front end 180 of the texture cache architecture 108 starting with the Address Generation Controller (AGC). In one embodiment, the AGC coalesces the accesses into a set of the smallest number of non conflicting tag accesses and data bank accesses. In one embodiment, the AGC then looks up the tags in the TAGS unit, which delivers misses to the ADDRESS COMPUTE unit. The ADDRESS COMPUTE unit, in turn, generates addresses to access compressed texture data in the L1C Cache.

In one embodiment, in the event of a cache miss in the TC0 cache, the AGC supports generating addresses and the use of tags (from the TAGS unit) to access compressed texture data from the L1C cache using the address compute block. The compressed texture data is then buffered in streaming FIFO1, decompressed in the TD, buffered in streaming FIFO2, and then provided to the TC0 cache.

In one embodiment, the TC0 cache provides for reuse of decompressed texture data. In response to a cache hit, an output of the TC0 cache may be used, for example, by a texture filter unit (shown in phantom in FIG. 1B) to calculate a texture for a pixel. Additionally, as described below in more detail, in one embodiment read pointers to FIFO 1 and FIFO 2 may be controlled to improve reuse of texel data. In one embodiment, a control block 190 or other control features may, for example be provided to coordinate operation of the TD and read pointers of the first buffer (e.g., FIFO1) and/or the second buffer (e.g., FIFO2).

In one embodiment, the texture cache unit 110 accepts a request for texel data for a quad (2×2 set of pixels) and generates filtered texels for each active pixel in the quad, which can involve accessing 4 texels for each pixel for a total of 16 texels per cycle.

In one embodiment, the graphics system 100 has the flexibility to reorganize the data within a texture. In one embodiment, the driver 104 reorganizes the texture data to best suit the expected request patterns. Shader cores can be latency tolerant, as they are highly multi-threaded to exploit the natural parallelism present in graphics applications. Further, the multiple requests arriving each cycle at a texture cache can be correlated since they correspond to the texel requests made on behalf of a single quad.

In one embodiment, the organization of data in the TC0 cache is based on common data access patterns to permit the resulting handling of a set of texel accesses with a minimal number of data banks and tag lookups. In one embodiment, the data is organized into the TC0 cache, based on the locality patterns that are present in a set of accesses, to improve cache performance of the TC0 cache. For example, the data may be stored in a swizzled pattern across the data banks that constitute the TC0 texture cache's data store. Further, data that is likely to be accessed together may be grouped together into cache lines to reduce the number of distinct cache-lines and hence the number of distinct tag lookups needed. An example cache architecture disclosed herein supports operations that need only up to 4 tag-lookups per cycle and utilizing only 16 data banks. However, it will be appreciated that other number of tag lookups and data banks can be utilized in alternative embodiments.

Figure 1C:
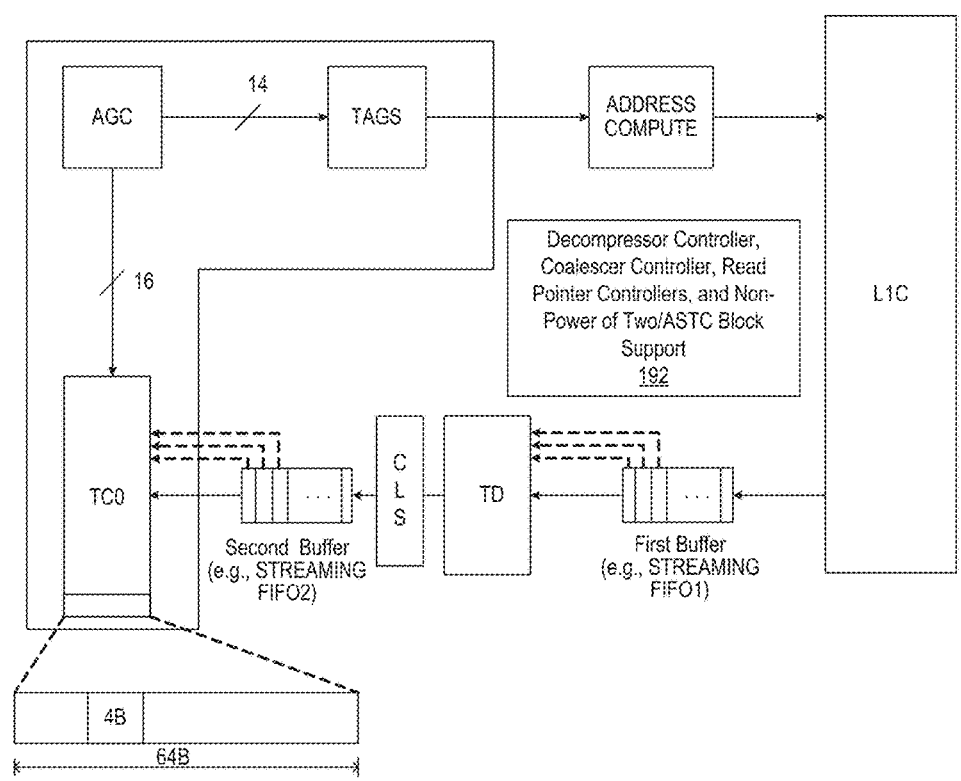
FIG. 1C illustrates an embodiment of the texture cache architecture of FIG. 1A supporting the ASTC codec.

Referring to FIG. 1C, additionally or alternatively, an embodiment facilitates texture compression schemes that utilize variable sized blocks, such as Adaptive Scalable Texture Compression (ASTC) codec. In one embodiment this may include, a coalescer (CLS) module to coalesce decompressed data from different sized blocks and a control block 192 with control features to control the CLS, decompressor, and read pointers to buffers and to support the use of variable sized blocks, such as those of the ASTC, which are described below in more detail.

In older texture compression schemes, each compressed block contains a fixed power-of-two texels and is stored in a fixed block size. For instance, the texture compression scheme described earlier compresses a 4×4 block of 2B texels into 8B, yielding a constant compression factor of 4. With a power-of-two compressed size and power-of-two block size in texels in each dimension, the computation of the starting address of the compressed block containing the texel (u, v) in a 2D texture involves only certain shift operations on u, v and the base address of the texture. Further, in one embodiment, the cache-line in the decompressed TC0 contains the entirety of single or small power-of-two compressed block. In one embodiment, a compressed block is not split across multiple cache-lines in the decompressed cache.

The ASTC texture compression scheme can compress a variable sized block ranging from 4×4 to 12×12 texels into 16B to capture the benefit of supporting a range of compression factors depending on the required quality. With such a variable sized block, address computation can become more complex. For instance, a 7×5 block results in division by 7 and to compute the memory address of the compressed block containing a desired texel. Such divisions can consume significant area and power.

In one embodiment, the TC0 cache operates in the uncompressed domain where a texel address is identified using the uncompressed (u, v) coordinates of the texel. In response to a miss in the TC0 Cache, the compressed block address of the missing uncompressed cache-lines is computed in the ADDRESS COMPUTE unit.

In one embodiment, FIFO1 is sized to improve performance. When an ASTC or other compressed block is requested from L1C, the L1C returns a cache-line containing a set of two or more compressed blocks (e.g., multiple blocks). For example, if the ASTC compressed block is 16B and the cache line is 64B, the L1C returns four compressed blocks. One or more of these blocks is retained in FIFO1. Given the locality of access in texture requests, the TD may require some of these blocks within a small temporal window while it is resident in FIFO1. In such cases, the TD may retrieve it directly from FIFO1 without making another request to L1C, as it would otherwise have to, thus saving the power required to access L1C and potentially improving performance.

In one embodiment, FIFO2 is sized to improve performance. When a block is decompressed by the TD, it generates decompressed texels. But many of the texels in the block may not be immediately needed for the filling in the texels in a current cache-line. However, there may be other cache-line miss requests from TC0 that require these texels. In one embodiment, the decompressed texels are deposited into the streaming FIFO2. If some texels are indeed needed to satisfy subsequent TC0 cache-line fills, they are retrieved from streaming FIFO2, thereby avoiding another decompression of the entire compressed block by the TD.

In one embodiment, the streaming FIFOs of FIFO 1 and FIFO 2 use a first-in first-out replacement policy, eliminating the need for additional replacement policy management state. In one embodiment the streaming FIFOs also have tags that represent the future state of the FIFO after all prior references are processed. In one embodiment, one aspect of the streaming FIFOs is that they capture short-term spatial locality in the texture address stream. In one embodiment, control hardware detects that needed compressed blocks in FIFO1 or texel groups in FIFO2 are present and computes read pointers to access them from FIFO1 or FIFO2, respectively. That is, the read pointers are controlled to select individual entries with the first buffer using a first read pointer and select individual entries within the second buffer using a second read pointer. The capability to control the read pointers permits potential savings in regards to accessing the L1C or decompression of a block in the TD.

Figure 2:
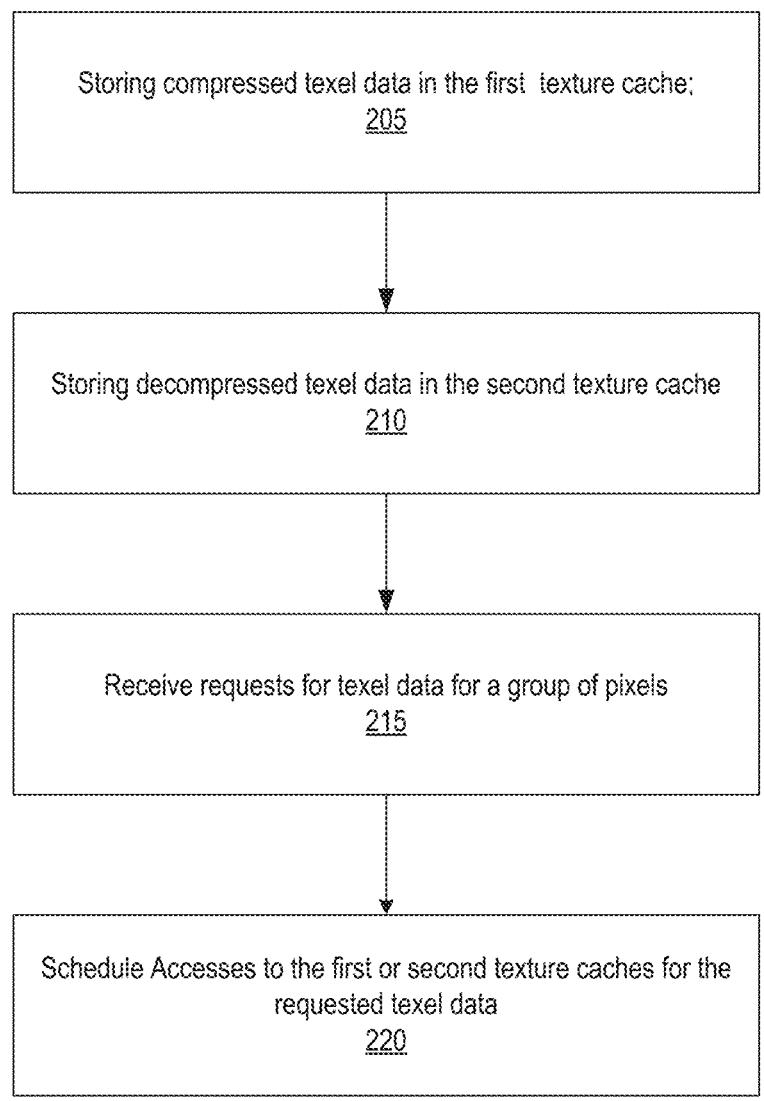
FIG. 2 illustrates a method of operating a graphics processing unit in accordance with an embodiment.

FIG. 2 is a flow diagram illustrating a method in accordance with an embodiment. Compressed texel data is stored in a first texture cache (e.g., the L1C cache). Decompressed texel data is stored 20 in a second texture cache (e.g., the TC0 cache). Requests are received 215 for texel data for a group of pixels. Accesses are scheduled 220 to the first or second texture caches for the requested texel data.

Figure 3:
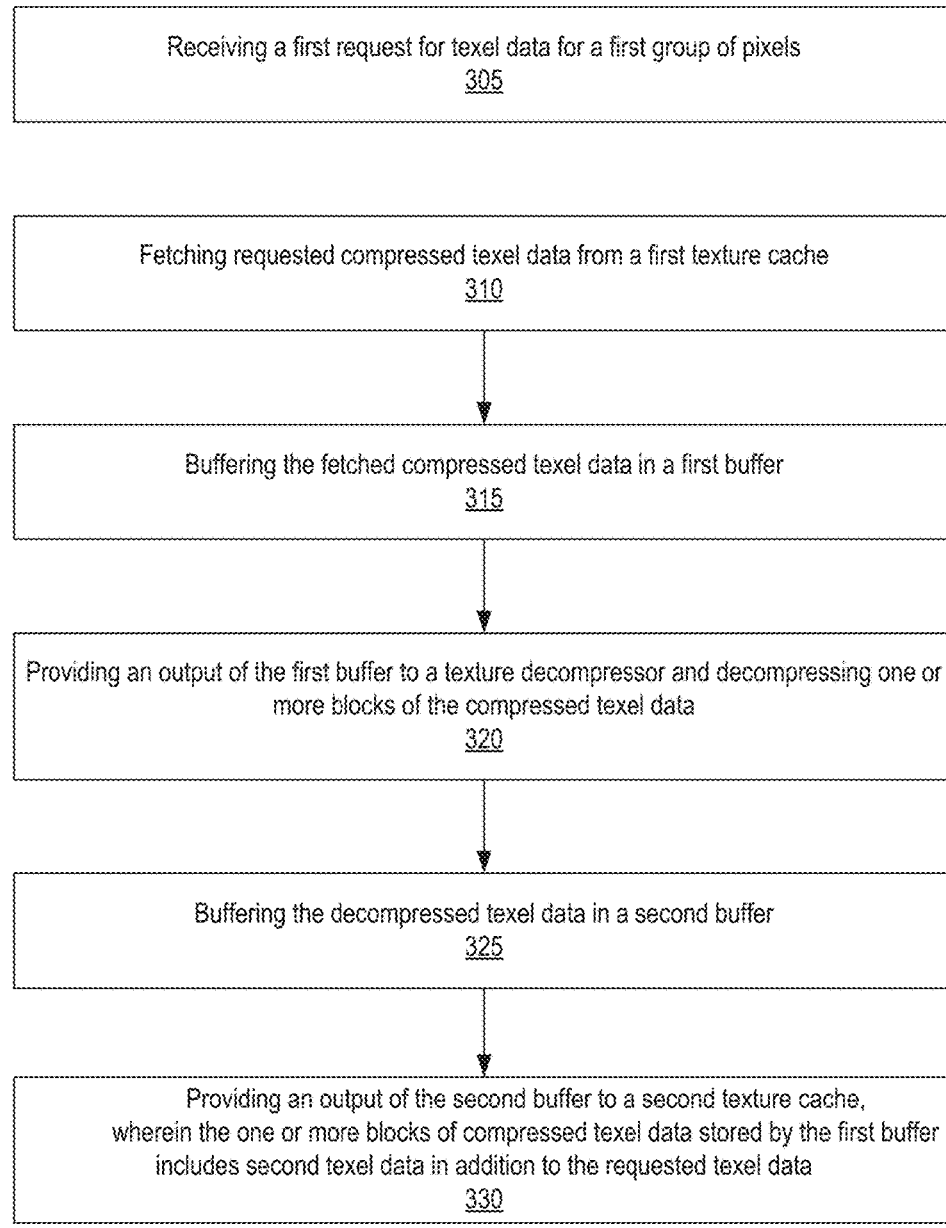
FIG. 3 illustrates a method of operating a graphics processing unit in accordance with an embodiment.

FIG. 3 is a flow diagram illustrating a method, in accordance with an embodiment, to emphasize aspects of the buffering. A first request is received 305 for texel data for a first group of pixels. The requested compressed texel data is fetched 310 from a first texture cache (e.g., the L1C cache). The fetched compressed texel data is buffered 315 in a first buffer. For example, the first buffer may comprise FIFO1. An output of the first buffer is provided 320 to a texture decompressor to decompress one or more blocks of the compressed texel data. The resulting decompressed texel data is buffered 325 in a second buffer. For example, the second buffer may comprise FIFO2. An output of the second buffer is provided 330 to a second texture cache (e.g., TC0). In some embodiments, one or more blocks of compressed texel data stored by the first buffer includes second texel data in addition to the requested texel data. In some embodiments, one or more uncompressed texel groups stored into the second buffer includes third uncompressed texel data in addition to the requested texel data. This third texel data is used to compose portions of uncompressed cache-lines of texel data that are requested by the TC0 cache in later transactions.

Figure 4:
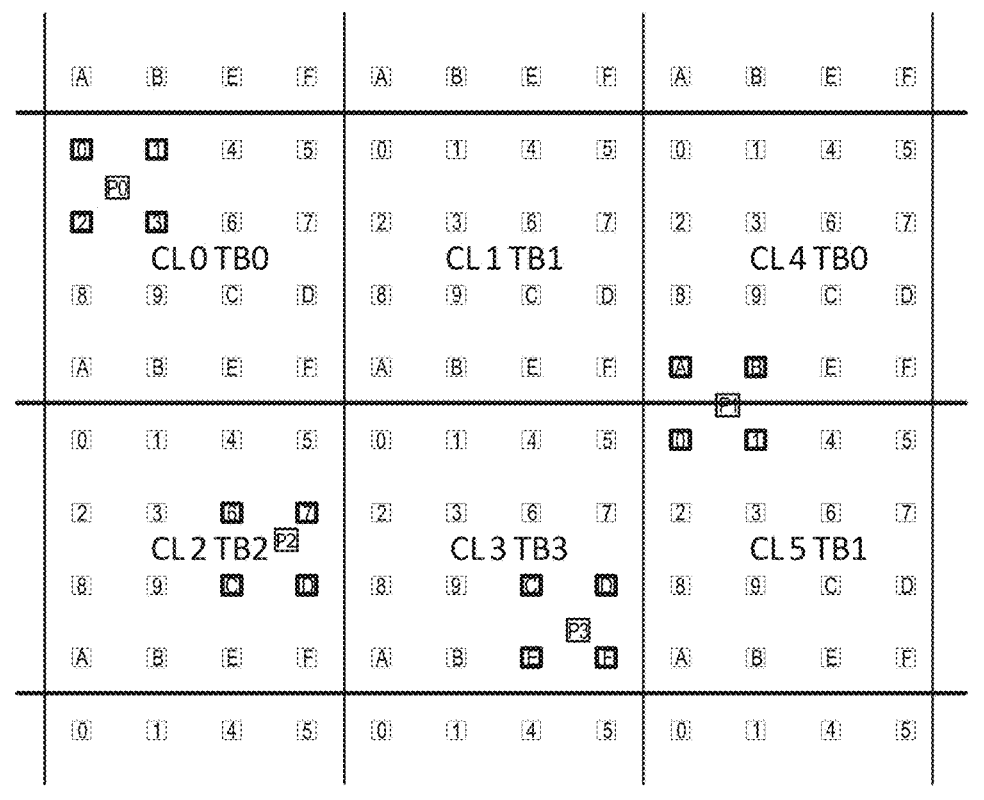

FIG. 4 illustrates cache data and tag mapping in the TC0 cache in accordance with an embodiment. In one embodiment, 16 requests are processed every cycle corresponding to 16 requests for a 2D texture on behalf of four pixels (P0, P1, P2, P3) illustrated, which are mapped to the texel space belonging to a quad. Each pixel is associated with four requests corresponding to the corners of a unit square in texel space, hence at coordinates (u,v), (u+1,v), (u, v+1) and (u+1, v+1), for example. By arranging the data within a cache-line at the TC0 level to contain a square (or close to square) region in texture space, these four requests for a particular pixel are located within a cache-line for the most part and multiple 1B/2B requests may even be co-located within a 4B dword in many cases.

FIG. 4 illustrates an example of how the texel data is laid out across the 16 banks numbered in hexadecimal from 0 . . . 9 A . . . F. A group of 16 texels (0 . . . 9 A . . . F) is contained in a cache-line with a single tag in the tag store. A 4×4 square set of texels (illustrated as squares contained a hexadecimal number 0 . . . 9 A . . . F) are mapped to each cache line numbered CL0 through CL15. For the purposes of illustration, the number within the texel represents the bank that holds the data. In this example, the tag for a cache-line is contained in the tag bank indicated by TB<num>. For the purposes of illustration, the texel squares with bolded outlines illustrate texels used to calculate a filtered texture value for a pixel (e.g., texels 0, 1, 2, and 3 in CL0 TB0 for pixel P0; texels A and B in CL4 TB0 and texels 0 and 1 in CL5 TB1 for pixel P1; texels 6, 7, C, and D in CL2 TB2 for pixel P2; and texels C, D, E, and F in CL3 TB3 for pixel P3).

FIG. 4 illustrates an example of how the cache lines are mapped to the four tag banks (TB0, TB1, TB2, and TB3), when the texel data size is 4B. In this case, the texture is a two dimensional (2D) array of texels each 4B in size. In one embodiment, the driver and the texture decompressor coordinate to lay out the data as shown. Each of the 16 squares for each cache line represents a texel and the number within the texel represents the bank that holds the data. Note that in one embodiment, the data is laid out in Z-order or Morton-order to exploit locality in two dimensions as opposed to a conventional layout that either exploits locality in one or the other dimension. Z-order (also known as Morton order) are functions that map multidimensional data while preserving the locality of data points.

The squares labeled (P0, P1, P2, P3) indicate where the four pixels of a quad from a texture request map to in texel space. Note that while they tend to be mapped to a square in texel space, they can also be mapped to any region in texel space. The texel squares in the dashed box proximate each pixel indicates the texels that are used to perform a bilinear filtering or a weighted average to compute the filtered texture value.

In this example of FIG. 4, each pixel uses four texels that are non-overlapping and therefore a total of 16 texels are required to be fetched from the cache. This can represent an infrequent extreme case but is chosen to illustrate the operation of the TC0 cache in general.

In one embodiment, operation of the TC0 cache may take into account one or more constraints on texel access, depending on cache implementation. In one embodiment, the TC0 cache is configured to access at most, one unique texel from each bank during a data access. However, in the example of FIG. 4 each pixel requires accesses to texel data from specific banks. For example, pixels P2 and P3 access texels mapped to banks C and D such that, with the constraint of at most one unique texel accessed from each bank during a data access, the access for pixels P2 and P3 occur over at least two cycles. Another example of a possible constraint, is a constraint on the TC0 cache that no more than one tag access may be made to a tag bank.

Any constraints on texel access may be taken into account by the AGC to organize a sequence of texel accesses. In one embodiment, the AGC shown in FIG. 1B serves to split up the accesses of a quad into multiple sets so that each set can be performed without data bank conflicts or tag bank conflicts (if that constraint applies). In one example, the AGC may schedule accesses for P0 and P2 of FIG. 4 in one cycle, since these involve non-conflicting tag banks TB0 and TB2 for Cache Lines CL0 and CL2, and non-conflicting data banks (0, 1, 2, 3) for P0 and (6, 7, C, D) for P2. Similarly the accesses for P1 and P3 only involve non-conflicting tag banks TB0, TB1 and TB3 for pixels P1 and P3 an non-conflicting data banks (A, B, 0, 1) and (C, D, E, F) respectively.

Though the four pixels of a quad may map to arbitrary locations in the texture space, they may tend to be close in texture space. In particular, with properly mip-mapped surfaces, the distances between pixels of a quad in texture space tend to be less than 1.5 for bilinear sampling and less than 1.0/2.0 for the higher/lower mip-level for trilinear sampling respectively.

Figure 5:
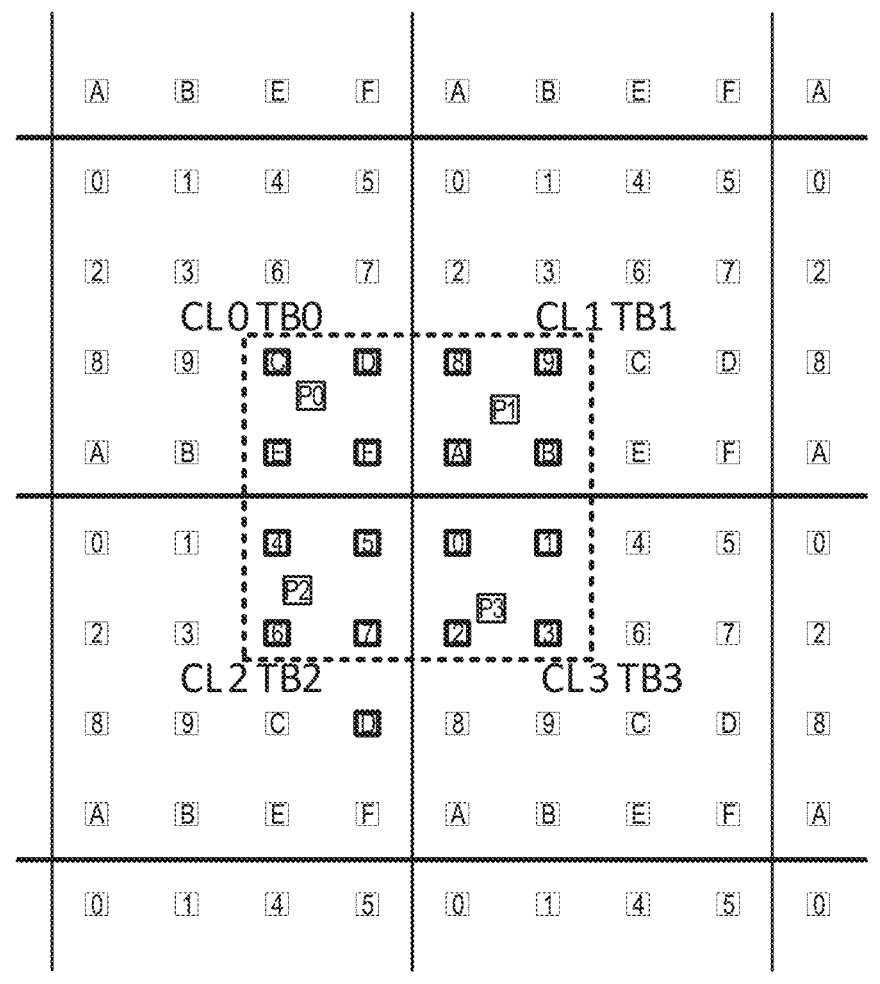

FIG. 5 illustrates conflict-free access to 16 texels in accordance with an embodiment. FIG. 5 is representative of the scenario of accessing 16 texels on behalf of a single quad in which all 16 texels may be accessed in a single cycle. When the horizontal and vertical separation in texel space between the locations where the pixels of a quad map to in texel space, the footprint (or layout) is a 4×4 set of texels as shown with bolded outlines. The squares P0, P1, P2, and P3 represent the locations of the pixels in texel space and it can be seen that the union of the set of four neighboring texels for all four pixels is a 4×4 set of texels (with bolded outlines) referred to subsequently as the texel footprint.

In the situation of FIG. 5, the texels in the texel footprint are distributed over four cache-lines and these cache-lines in turn map to four distinct tag banks. Thus, the tags may be accessed in parallel without bank conflicts. In particular, the numbering of the bolded texel squares is all distinct; no two bolded squares have the same number indicating that they map to the same data bank. Hence all 16 texels may be accessed in a conflict-free manner. In general, regardless of the location of the 4×4 texel footprint, all 16 texels will be mapped to distinct banks and further these texels map to at most 4 cache-lines mapping to distinct tag banks. Hence, regardless of the 4×4 texel footprint, there is conflict-free access. For this case, the AGC looks at the texel footprint and schedules all tag accesses and data bank accesses to a single cycle in such cases.

Figure 6:
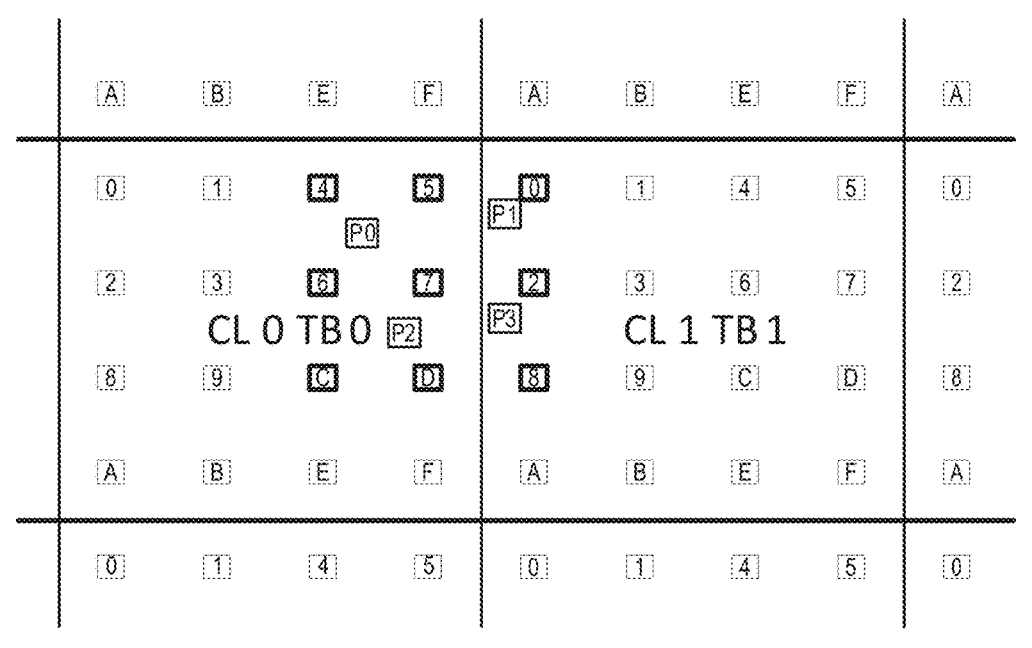

FIG. 6 illustrates an embodiment of a texel footprint for properly-mip-mapped texture when performing bilinear filtering. When the spacing in texel space is roughly 1.5 texels, pixels tend to share the same texels and hence the texel footprint is often 3×3 as shown in FIG. 6. In this case, the nine texels with bolded outlines have distinct numbers, indicating that no two texels in the footprint map to the same bank. Further, all nine texels belong to one of two cache-lines that are mapped to distinct tag banks. As before, these observations apply regardless of the positioning of the 3×3 footprint.

In some cases, the pixels may be warped in texel space. For example, the texel footprint may be diagonal or otherwise not aligned horizontally/vertically. Even in such cases, all texels may be accessed in a conflict-free manner provided the inter-pixel spacing is less than 1.5 texels.

Figure 7:
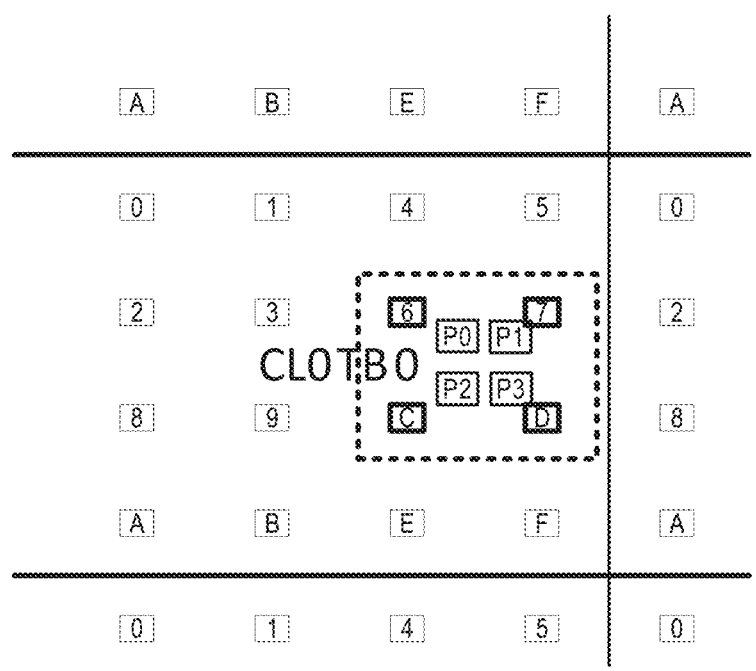
FIG. 7 illustrates an example of cache access for 2×2 footprint of a quad in accordance with an embodiment.

FIG. 7 illustrates a minimal 2×2 footprint of a quad in accordance with an embodiment. FIG. 7 shows the texel footprint when the pixels map to such a small region in texel space that the texel footprint is reduced to the minimal 2×2 footprint 9 (i.e., the four texels with bolded outlines). This can occur, for example, at the upper (less-detailed) mip-level when doing trilinear filtering. This footprint can be handled in a conflict-free manner with the four texels mapped to different banks and all four texels can belong to a single cache-line.

Accordingly, in an example embodiment the TC0 cache supports four tag-lookups per cycle. Each TC0 cache line of 64B is mapped to 16 banks, each 32b wide. Each bank has a single read-port. If a quad's requests require more than one access to each bank or more than four tag-lookups, the request is split over multiple cycles so that these constraints are satisfied in each cycle.

Furthermore, in order to provide good performance for many cases, in one embodiment the driver organizes texture data in memory and the hardware decompressor further arranges the data in the TC0 cache lines to minimize data bank conflicts and tag-lookups. In one embodiment, the texture data is organized into mtiles within which cache lines are organized in Morton (Z-) order by the driver such that a contiguous square block of texels requires the minimum number (i.e., less than a predefined number) of distinct cache lines and hence tag-lookups. Thus, in one embodiment, as long as the texture requests on behalf of the four pixels of a quad map to a 2×2 block of cache lines within an mtile, no more than four tag-lookups are needed.

In one embodiment, with a TC0 cache line size of 64B, each cache-line in a common 2B/texel texture holds an 8×4 block of texels. Therefore, a 2×2 block of cache lines holds a 16×8 block of texels. The texel footprint of a quad can be a 3×3 texel block. With a suitable mip-mapping, the largest expected texel footprint is for a quad oriented at 45 degrees with an inter-pixel distance in texel space of 2 texels. Such a texel footprint is $(2\sqrt{2}+1=)$ 3.8×3.8 block, well under the 16×8 texels contained in a 2×2 block of cache-lines. Hence, bank-conflicts are avoided for many cases.

Figure 8:
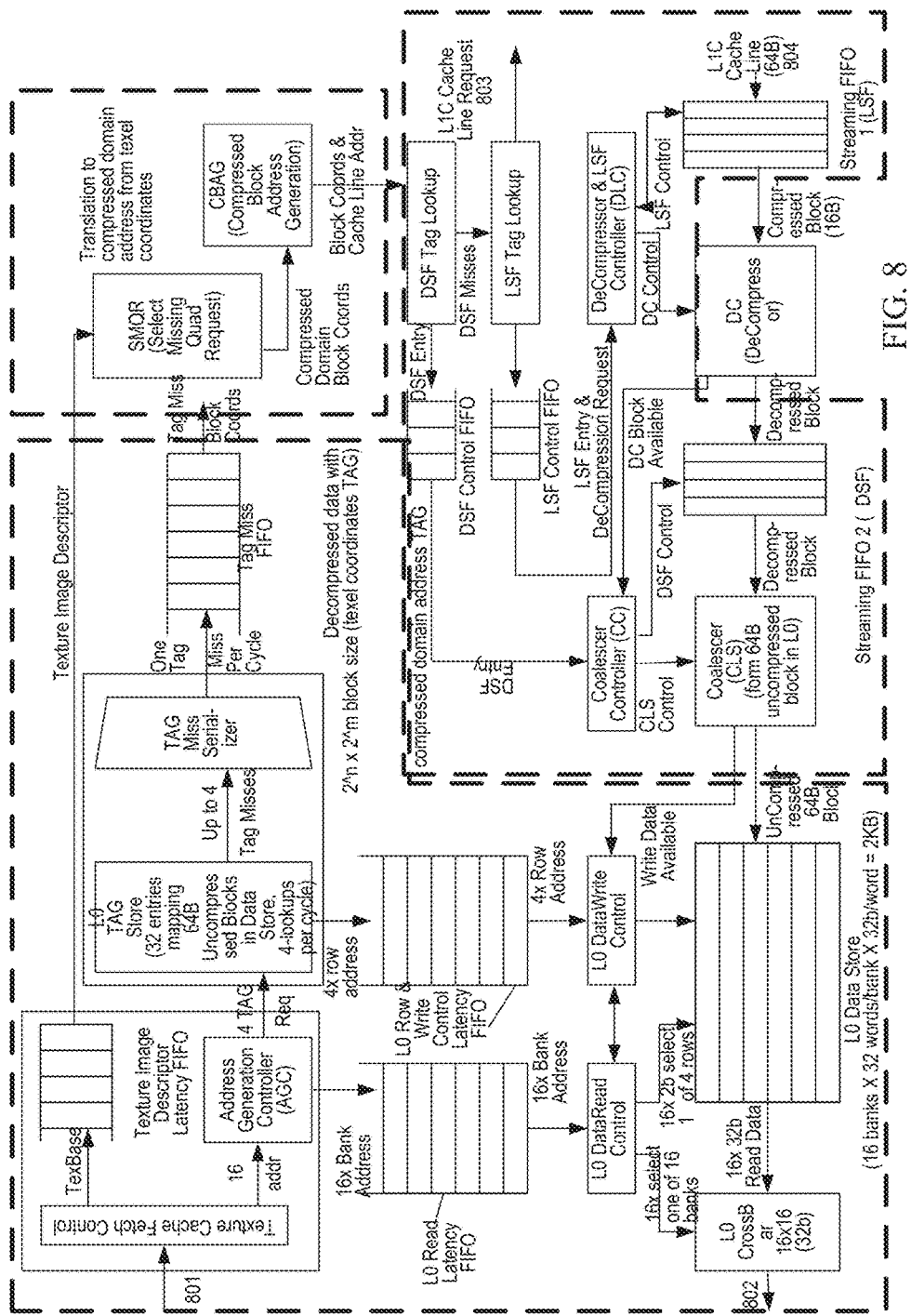
FIG. 8 illustrates an example of sub-blocks of a texture cache architecture in accordance with an embodiment.

In one embodiment, in the event that the requests are not properly mip-mapped, the original texture requests are split up into multiple requests. In the common case, the texture cache processes 16 requests in a highly-efficient manner leveraging the expected properties of these requests to deliver both high-bandwidth and high power-efficiency FIG. 8 illustrates sub-blocks of a portion of the texture cache architecture in accordance with an embodiment. The L1C cache is omitted in FIG. 6. In one embodiment, a L0 data store is provided for the TC0 cache. In one embodiment, the L0 data store corresponds to 16 banks with 32 words per bank and 32b per word. A L0 data read control block and a L0 data write control block control reading and writing data from the L0 data store. In one embodiment, a L0 crossbar is used to output texel data. A L0 read latency FIFO receives bank addresses from the AGC. The L0 Row & Write control latency FIFO receives row addressed from the L0 Tag Store.

In one embodiment, a first input 801 (from the Texture Address (TA) sub-unit (not shown in FIG. 8) corresponds to up to 16 addresses. Each request is for up to 16 texels, corresponding to a texture base address and 16 (u,v) coordinates in a 2D texture. The texture base address for each request is shared across all 16 texels. Each quad consists of four pixels and each pixel accesses 4 texels arranged in a unit-square with a pair of coordinates: coord_u, coord_v. In each pair, coord_u[i][1] can be coord_u[i]+1 except for wrapping cases. For 3D textures, each pixel accesses 8 texels arranged in a unit-cube requiring another coordinate, coord_w to specify the additional dimension.

In one embodiment, the remaining fields on a first input packet from the TA unit are derived from state as well as the input. The mipmapped width, height and depth are the dimensions of the texture image at the mip-level for this request and are needed to compute offsets from the provided base address. In one embodiment, the texture format describes the format of the texture image, in the particular texel size. In one embodiment, aspects of the format are used by the downstream TD sub-unit. In one embodiment two fields, nr_samples and sample_idx are used for multi-sampled texture accesses.

In one embodiment, the texel data output 802 consists of two sets of 16 texels each 32b wide. For texel sizes larger than 32b, a power-of-two set of outputs are ganged up together to send a single texel and the set of 16 texels is delivered over multiple cycles.

Arrows 803 and 804 illustrate interactions with the L1C cache. In the event of a TC0 cache miss, a request is made to the L1C cache providing a virtual address of the cache-line. Since the virtual address is 48b and the log 2 of the cache line size is 6b, this address is 42b. In response, the L1C delivers the 64B data.

In one embodiment, the AGC receives two coordinate locations in u, v, w dimensions for the four pixels of a quad for a total of 16 coordinates to specify 16 texels. The AGC output consists of up to four tag requests and the data bank and crossbar control bits required to access texels from the data arrays.

In one embodiment, the AGC accepts 16 requests from a texture address unit and generates tag lookups in the TC0 TAG Store. In addition, the AGC generates the control bits used to select one of four line addresses for each of 16 banks and to route the 32b of data from each data bank to an output port. The tags are immediately updated on a miss and the misses are sent to the L1C cache. The data access is delayed until the data arrives from L1C. The delayed access requests are held in the latency FIFOs and processed in an in-order fashion. The 16 banks may be read simultaneously on behalf of the 16 texels. The data is routed to the correct texel output at the output crossbar.

In one embodiment, AGC organizes these 16 requests into the smallest number of sets (e.g., one) so that the texel requests within a set do not access more than four cache lines and no more than one 4B fetch from each of the 16 data banks. In one embodiment, the AGC provides up to four tags in each cycle to the L0 Tag Store. The L0 TAG Store writes into the L0 Row & Write Control Latency FIFO. In one embodiment, a Coalescer (CLS) and CLS controller is provided to support coalescing decompressed blocks into a standard form size.

In one embodiment, the Data Write Control block accepts incoming data from the Coalescer and fills the TC0 Data array. A L0 Data Read Control block pops the RD L0 FIFO written into by the AGC and coordinates reading out up to four cache lines and selecting up to 16 texels of data from these four cache lines. The TC0 delivers up to 16 texels to the Texture Filter.

In one embodiment, the TC0 cache parameters are 2 KB size, 64B line size, 32 lines, 4 sets, 8-way set-associative. In one embodiment, the TC0 cache is addressed using a concatenation of the 40b base address and the u, v coordinates which are each 14b for 2D textures for a total of 40+28=68b. But 3D textures have three coordinates each 11b, thereby requiring support for an address width of 40+33=73b in texel space. However, given that the minimum texel block in a ctile is 2×2×1 and the number of texels in a ctile in each axis is a power of 2, the u, v coordinates will be always even. It is not necessary to store the LSB 1 bit of u, v coordinates as a tag. This leaves 71b of tag bits. There are a total of four incoming tags every cycle, all of which may be directed at a particular tag bank. Each tag bank has sufficient comparators and other resources to support tag matching on up to four incoming tags. Each incoming 71b tag address is compared against all 8 7 lb tags in parallel. On a match, a 5b line address is sent down to the read tag latency FIFO.

On a miss, the missing address is sent to the L1C cache. In one embodiment, each of the four cache-line requests may miss the cache leading to a maximum of four misses being generated in a cycle. On a miss, a corresponding data_ram_line_miss bit for that bank is set. One of the eight lines in the set is selected for replacement and its tag over-written with the new tag. In some situations, there may be pending requests on a replaced tag, but as a lookup has already been performed for the line addresses for these requests this means that it is possible to only overwrite a cache-line immediately before the first use and therefore after any pending requests. With a streaming cache organization, tags may be over-written even before the corresponding data has been read out from the data RAMs.

In one embodiment, a locality-based replacement policy is adopted to maximally exploit spatial locality in texture accesses. When the input 71b tag is compared to tags in a cache set, it is also determined if differences are only in the lower bits of coordinate components. The victim is chosen out of high order miss tags at first. When there are no high order miss tags, the victim is chosen out of low order miss tags. In one embodiment, random selection is used in the same priority group. A low order miss is detected by the following criteria. If there is a difference in the base address, it's a high order miss. Otherwise, for 2D textures, 3D textures in a slice organization: If differences are only in the LSB 6 bits of each u, v coordinate components, it is a low order miss. For 3D textures in 3D block organization: If differences are only in the LSB 4 bits of each u, v, w coordinate components, it is a low order miss. Otherwise, it is a high order miss.

As shown in FIG. 8, in one embodiment the STREAMING FIFO 1 (LSF to denote it is receiving data from the L1 cache) holds potentially compressed cache lines delivered from the L1C. The TD decompresses blocks of compressed texels into decompressed cache lines. STREAMING FIFO 2 (DSF to denote that it is receiving data from the decompressor) holds these decompressed cache-lines. The TC0 holds decompressed texels organized into 64B cache lines, where each 4B segment is stored m a separate data bank with the entire cache-line stored across 16 data banks.

In one embodiment, each decoded RGBA ASTC texel occupies 8 bytes of space (floating point 16 for each component), allowing the TC0 cache line (64B; to bold 8 uncompressed texels organized as a 4×2 block with 4 columns and 2 rows. Each compressed 8B ASTC block contains 5×5 compressed texels. On a miss, the TC will request for a grid of 4C×2R uncompressed texels (4 columns by 2 rows) The 4C×2R grid can map to multiple (1-4) compressed ASTC blocks depending on how the uncompressed grid maps on to the compressed AS'TC grid.

In one embodiment, the CLS and associated control features are used to produce aligned blocks of uncompressed texel data that can be loaded into the L0 Data Store. This is useful for non-power-of-two block size dimensions as present in the ASTC. For other compression schemes, the decompression factor is a small power-of-two and each compressed block expands readily into 64B cache lines. That is, decompressing a small power-of-two set of compressed blocks produces an aligned 64B of uncompressed texel data that can be loaded directly into the L0 data store. In one embodiment, the decompressor & LSF controller (DLC) controller decompress multiple (variable size) ASTC blocks to produce the decompressed 4×4 texel block in a 64B line. Additional coordination is provided via control of read pointers into FIFO 1 and FIFO 2.

Consider, as an example, how power and bandwidth may be wasted if ASTC blocks are decompressed and utilized without proper coordination and reuse. A nominal texel size of 4B, which implies a 4×4 block for a 64B line in the L0 Data Store. Since the ASTC non-power-of-two blocks are not aligned on the 4×4 uncompressed block in a L0 Data Store cache line, each such block may require decompressing up to 4 blocks (say 6×6) for a total of 6*6*4=144 texels. Only 16 of these texels are required for a 4×4 block. Therefore, up to 144-16=128 texels may be discarded wasting decompressor power and bandwidth. Further, these 4 blocks may be on 4 separate 64B lines in the worst case, wasting L1C access power and bandwidth.

However, suppose there is substantial spatial locality in the texture access pattern. It is therefore likely that decompressed texels unused in populating one 4×4 block in the L0 data store will soon be used for populating other requested nearby 4×4 blocks. Similarly, the 4 ASTC blocks comprising an L1 cache line are likely to be reused for nearby 4×4 blocks. Hence, the two small buffers (FIFO 1 and FIFO2) that cache compressed L1 cache lines and decompressed ASTC blocks can be effective in reducing the number of cache-line blocks fetched from L1C and the number of decompressed texels that are unused.

In a streaming FIFO, the oldest written line is always selected for replacement. Thus the write pointer is incremented in a wrap-around fashion on each write. However, the reads may occur from any line within a window of writes. A line may be read multiple times leading to exploitation of reuse. The returning L1C cache lines are deposited into the Streaming FIFO 1. The decompressor reads 16B blocks (potentially larger for non-ASTC) from Streaming FTFO 1, decompresses them and sends out them to the CLS. The CLS collects TD output data to construct a 64B cache line and writes them into the L0 data Store. The Streaming FIFOs are simple caching structures aimed at eliminating excess request traffic to the L1C.

The TC uses a small buffer at the input of the decompressor because the same compressed block may be needed to generate multiple decompressed 64B blocks in temporal proximity.

Additional aspects of FIG. 8 include a tag miss FIFO that receives tags for tag misses (serialized by the tag Miss serializer). The Select Missing Quad Request (SMQR) block selects one of the missing requests, pairs it with the base address and associated information from the texture image descriptor, and delivers the entire packet to the compressed block address generation unit (CBAG). Specifically, for each dimension, CBAG computes the minimum and maximum of the texel dimensions. For 2D textures, the output is therefore the base address, (u min, u max) and (v min, v max). In one embodiment, the CBAG computes up to 4 ASTC block addresses in the compressed (memory) address space. In general, this address computation involves dividing each dimension range by the ASTC block size in that dimension. For instance, with 5×6 blocks, divide (u min, u max) by 5 and (v min, v max) by 6 to get the ASTC blocks needed. Next, the addresses of each of these blocks are computed. The output is a set of up to 4 ASTC block addresses whose low-order 4b are zero (since the ASTC block size is $2^4$=16B).

In one embodiment, the texture decompressor (DC) can process up to 4 output texels which are laid in one of predefined organizations per cycle. In one embodiment, the DSF tag lookup and LSF tag lookup splits memory access traffic into multiple of pre-defined texel footprint patterns and sends them out one by one. FIG. 9 illustrates an example of ASTC texel footprint patterns that can be handled by the DC in accordance with an embodiment. Six different example cases are illustrated in which different options to process, 1, 2, 3, or 4 texels in one or two cycles are illustrated.

In one embodiment, the CLS is controlled by the DSF Entry signal, which in turn receives the control bits through the DSF Tag lookup. These control bits specify a set of up to 9 texel quads (for the 4B texel size case) from 9 banks, though a 4×4 sized block can be generated from 4 texel quads. Additional control bits specify which portions of these quads are routed to which portions of the 64B cache line in L0 data store. The CLS reads the prescribed quads, routes the data and writes the 64B cache line into the L0 data store on receiving a ready signal (e.g., from the CC).

In one embodiment, the incoming addresses from the DSF tag lookup are hit-tested in a fully-associative LSF Tag lookup. Misses are allocated an entry at the write-pointer which is advanced. Misses are sent to the L1C. In one embodiment, the LSF control FIFO functions both as a streaming FIFO and as a buffer between L1C and the decompressor control (DLC).

Figure 10:
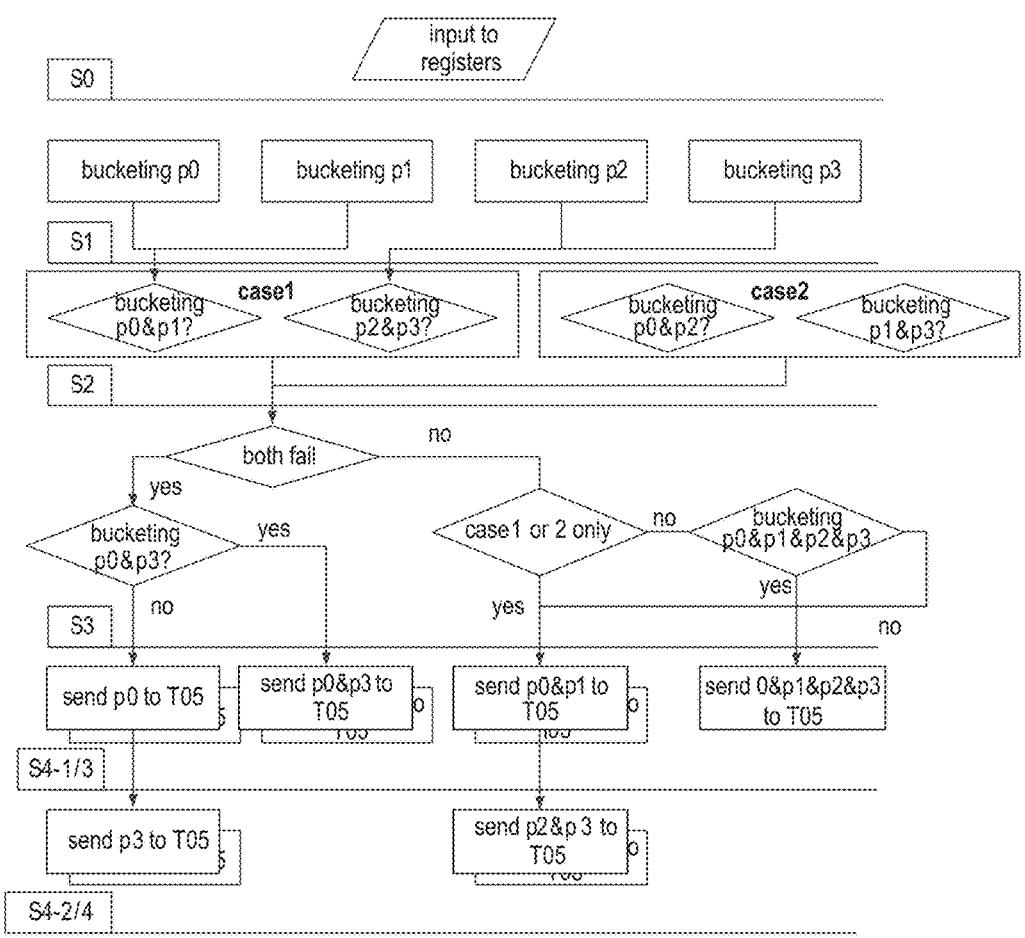
FIG. 10 illustrates an example of address generation control to combine texel requests in accordance with an embodiment.

FIG. 10 illustrates an AGC process flow in accordance with an embodiment. A process of organizing texel requests is spread across multiple steps (S0, S1, S2, S3, S4) where each step attempts to combine a larger or different group of requests that satisfy a set of constraints. In one embodiment, the set of constraints includes no more than four distinct cache lines and no more than one dword from each bank. However, it will be understood that other constraints could be utilized. In a first step S1, requests originating from each pixel are examined to find the cache-line addresses that are used for these requests. Each cache-line address is then linked to the bank offset required for each of the four requests. This process is called bucketing in FIG. 8. The first step, S1, therefore produces four groups with four buckets each, each bucket containing up to four texel requests. In subsequent steps, each bucket may contain many more texel requests provided they do not have bank conflicts with other requests in the group. In one embodiment, driver software organizes texture data so that the requests associated with a pixel are extremely unlikely to have bank conflicts. However, in the rare event that there is a bank conflict, the corresponding pixel's requests are handled separately.

In a second step, S2, consider the two combinations of pairs of buckets. For instance, bucketing p0&p1 examines whether all the requests associated with pixels p0 and p1 which were in two different bucket sets can be put into a single bucket set while still satisfying the constraints, namely, no more than four distinct cache lines and no more than one dword from each bank. At the end of the second step, we have the bucketing of the two cases where the pixels are paired up differently The third step, S3, examines whether both sets of pairings fail, in which case we bucket a third pairing of p0 and p3 and send over the requests for p0&p3 if that bucketing meets the constraints. This is followed by examining p1&p2 (not shown). The most common case however is that both cases 1 and 2 meet all constraints, in which case, the process considers bucketing all four pixels as shown by "bucketing p0&p1&p2&p3". Again, an example case is that this bucketing is successful and all requests of the requests from the four pixels can be handled in the same cycle.

FIG. 10 illustrates other cases as well, such as when pixel p0's requests have to be sent separately, as illustrated in step S4. The process is hierarchical, starting with a single pixel's requests and then building up pairs and finally quads of pixels that are compatible with respect to their tag and data bank access requirements. The process terminates efficiently in the common case of all four pixels being bucketed together but is also useful to quickly determine subsets that are compatible in other cases.

Figure 11:
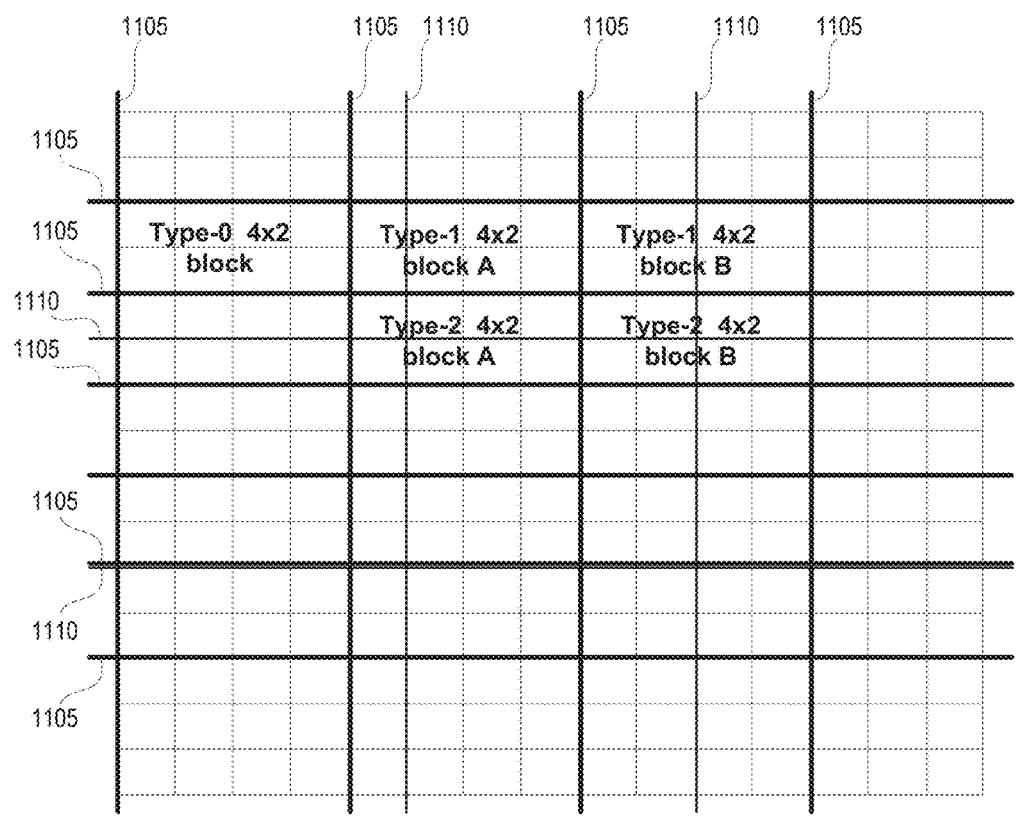
FIG. 11 illustrates an example of ASTC block sizes and texture cache line boundaries in accordance with an embodiment.
Figure 12:
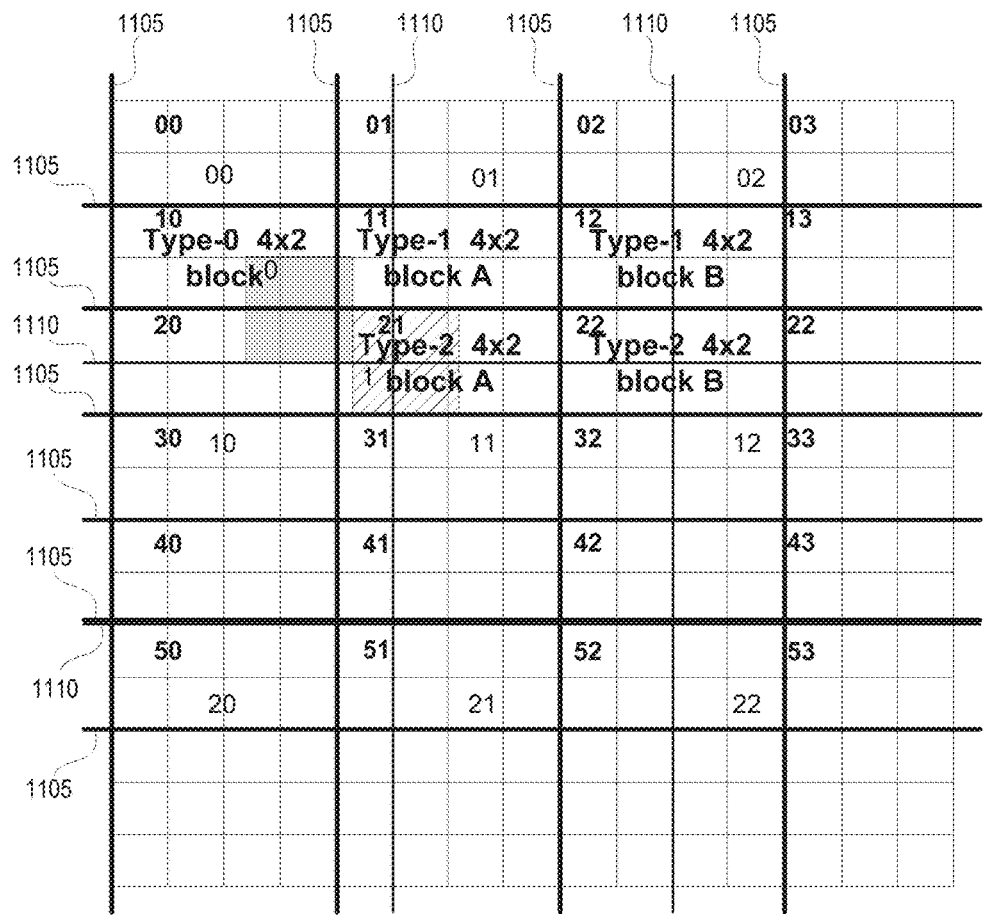
FIG. 12 illustrates an example of ASTC block sizes and texture cache boundaries over a sequence of accesses.

FIG. 11 shows texture cache boundaries and ASTC block diagrams for an example of three possible block mappings in accordance with an embodiment. FIG. 12 illustrates an example for a 15×15 ASTC texture. The thick bolded lines 1105 show cache line boundaries in the TC0 and requests to DC on a miss. The thin bolded lines 1110 show ATSC 5×5 block boundaries of the texture. On a miss, the TC0 requests a 4×2 texel grid from the ASTC decoder in the TD. Depending on cache line miss, three types of requests are possible. For a type 0 block, a miss maps within one ASTC 5×5 block. The TD will deliver the decoded texels in 2 cycles (measure of throughput not latency). For a type 1 block, the miss maps to two ASTC 5×5 blocks. TD will decode the block in 2 (block B) or 3 (block A) cycles. Block A requires 2 cycles on the second ASTC block (since it needs to decode 6 texels) and 1 cycle (1C×2R) on the first ASTC block. Block B requires 1 cycle each on both ASTC blocks. A Type 2 block miss maps onto 4 ASTC 5×5 blocks. Both block A and B require four cycles for decoding. In one embodiment, the TD is required to decode 2C×2R, 4C×1 R (or subsets), and 1 C×2R blocks to support throughput.

In addition to supporting ASTC, the Streaming FIFO2 can also support ETC2 compressed formats efficiently in example embodiments. As a result, in one embodiment, the Streaming FIFO2 comprises of 4-128 bit wide banks, enough to store 8 AS'TC decoded texels or 16 ETC2 decoded texels. Each of the banks has support for lane masking and an ability to write either the upper 64b or the lower 64b in example embodiments. In terms of texel numbering within a 4×2 block for ASTC decoded texels, bank 0 holds texels 0 and 1, bank 1 holds texels 2 and 3, and so on. In example embodiments, no bank conflicts arise for all three types of blocks.

In an example embodiment, the decoder decodes 4C×1R or 1C×2R blocks if there is choice of flexibility. The TD will decode 2C×2R blocks only for the Type-1 block B case.

An example of texture cache to texture decompressor ordering for ASTC textures will now be described. For a type 0 block, a request can be made 8 texels from the TD for filling a cache line. There are two choices to request decoding from the TD unit. The request can be either a request up to 2 4C×1R blocks or a request up to 2 2C×2R blocks.

In one embodiment, for type 1 blocks, a request is made for uncompressed data from two ASTC blocks. It requests 2-4 texels from each block. In one embodiment, the following order is followed:

Request 1C×2R or 2C×2R or 3C×2R from a top left ASTC block.

For 1C×2R requests, in one embodiment, the Streaming FIFO 2 Decompressor Output has support for lane masking of individual texels to different banks (e.g., texel 0 is written to bank 0, texel 4 is written to bank 2 texels 3 is written to bank 1, and texel 6 is written to bank 3).

For 2C×2R cases, requests are written to bank O and bank 2 or vice versa, respectively.

Request 1C×2R or 2C×2R or 3C×2R from top right ASTC block.

Always follow a Z-order of request.

For type 2 blocks, the texture cache requests data from four ASTC blocks. In these cases a Z-order is preserved.

Request 1C×1R or 2C×1R or 3C×IR from top left ASTC block.

Request 1C×1 R or 2C×1 R or 3C×1 R from top right ASTC block.

Request 1C×1R or 2C×1R or 3C×1R from bottom left ASTC block.

Request 1 C×1R or 2C×1R or 3C×1 R from bottom right ASTC block.

In these cases, the ordering is exactly the same, and support for lane masking in the Streaming FIFO2 allows the data to be written efficiently. Supporting 3C×2R requires additional buffering on the TD and this may be further split into two 3C×1R requests.

The relationship between the uncompressed domain addresses and the addresses of the corresponding compressed blocks in memory can be complicated for non-power of two block sizes used in ASTC. The texel data needed for an aligned 64B block may come from multiple compressed blocks.

FIG. 12 illustrates an example showing ASTC 5×5: 64b texels. The boundaries are illustrated by thin bolded lines 1110. The blocks numbered in thin bolded lines from 00 . . . 02 on first row with last row numbered 20 . . . 22. The cache line contains 4 ASTC blocks (00, 01, 10, 11).

The texture cache blocks are 4×2 64b texels. The block boundaries are illustrated by thick bolded lines 1105. The blocks numbered in thick bolded lines from 00 . . . 03 on first row and 00 through 50 on first column.

The first access has texel footprint shown as a shaded block as 0 and the second access has hatched block footprint as 1.

Starting from empty caches/buffers, the first access brings in cache line with (00, 01, 10, 11) into LSF decompresses ASTC thin bolded block 00 and stores in DSF fills TC0 with uncompressed thick bolded blocks 10, 20.

The second access hits in DSF for ASTC block 00 and in LSF on ASTC blocks (01, 10, 11) This saves on repeated decompression of ASTC block 00 and accessing L1C again for cache-line containing (01, 10, 11).

Decompression is performed of the ASTC block (01, 10, 11). The coalescer composes all three plus decompressed 00 to generate uncompressed thick bolded block 21. This fills TC0 with uncompressed thick bolded block 21.

An exemplary, but non-limiting application of an embodiment of the present invention is in a mobile environment. In a mobile environment, there are constraints on memory bandwidth and the power required to transfer data from main memory via an L2 cache to the texture caches of the GPU. The energy cost of moving a dword (4B) from low power double data rate random access memory (LPDDR) to an L1 cache is estimated to be about 50 times of doing a floating-point operation. Accordingly, example embodiments disclosed herein can facilitate compression formats that achieve high compression factors in the texture unit of a mobile GPU.

While compressed formats can be energy-efficient in terms of data movement costs, the energy cost associated with decompression can be significant. For instance, in an example block compression format, the decompressor linearly interpolates between two colors to generate a total of, say, four colors. The decompressor then selects an index based on the texel address and uses that 2b index to select one of the four colors. The energy cost of interpolating can be significant. The indexing mechanism introduces two-levels of lookup. With the trend toward supporting a variety of more sophisticated compression schemes, the decompression and data-routing energy costs can account for a significant fraction of overall texture unit power.

In order to amortize some of these costs over multiple texel accesses, example embodiments of a texture cache architecture interposes a Level 0 (TC0) cache between the decompressor and the addressing logic. The TC0 cache holds decompressed texels as opposed to the Level 1 cache (L1C) which holds texel data in the compressed format. The energy cost of decompression is amortized over multiple texel accesses over multiple cycles. For instance, if four texels are accessed from a 4×4 compressed block over four successive cycles, the TC0 cache holds the uncompressed texels over four cycles and the decompression cost is incurred only once compared to four times without the decompressed TC0 cache.

Another factor that contributes to power and area for supporting non power-of-two block dimensions conventionally is that while a cache-line contains a block of uncompressed texels with power-of-two dimensions such as 8×4, the compressed block in memory may be dimensioned to a non-power-of-two such as 7×5. In such cases, the boundaries of the compressed block may not align with that of the power-of-two block in a cache-line. In this specific example, filling an 8×4 may require two 7×5 blocks or 4 7×5 blocks. As a result, the texture decompressor has to decompress many compressed blocks to fill all the texels in a cache-line. Example embodiments may be utilized to support improved performance for non power of two block dimensions. Many of the same compressed blocks (or other blocks in the same L1C cache-line) may be required to fill the texels in the next few missing cache-lines and have to be repeatedly fetched from the L1C, resulting in wasted bandwidth and power. The streaming FIFO1, which holds recently-accessed compressed blocks, can serve to reduce access to L1C. If the next few cache-line fill requests require the same compressed blocks, the Streaming FIFO 1 delivers them to the TD without requiring an L1C access.

One aspect of an embodiment of the texture cache architecture is that texture cache clients are relatively insensitive to latency. In a CPU Level 1 cache, the tag access and the data access are done in parallel (or some way-prediction hardware is used) to reduce the cache hit latency to around 1-4 cycles. The latency of a texture unit even in the absence of any Level 1 misses can be over 50 cycles, due to the complex addressing logic involving, for instance, Level of Detail (LOD) computation and the texture filtering operations. On a cache miss followed by a cache hit to a different address, CPU caches deliver the data that hit the cache right away instead of waiting for the unrelated miss data to arrive from the next memory hierarchy level. Such out-of-order or hit-under-miss data return can reduce the latency of a single thread in a CPU but does not provide significant benefits in GPUs due to the vector nature of Shader Core accesses and the overall in-order nature of the graphics pipeline. Given the relative insensitivity of shader performance to texture latency, the large fixed component due to texture addressing and filtering and the in-order nature of the overall graphics pipeline, alternatives to the CPU Level 1 cache organization are attractive.

In one embodiment, all addresses sent to the texture cache architecture 108 are processed in-order. On a cache miss followed by a cache hit, delivery of the data for the cache hit is delayed till after the data for the cache miss. Further, a hit in the tag array does not necessarily imply that the corresponding data is present in the cache, only that it will be present in the cache once all prior references are processed. This streaming behavior of texture caches where all references are streamed through the cache entirely in order leads to important benefits and design simplifications. In a graphics pipeline, state and work are ordered, that is, any state that is received applies only to later work requests. Out-of-order handling of hits before misses complicates the application of state to the data. For instance, the texture-filtering logic has to recognize that a newer state is to be applied to hits while it retains the older state to apply to misses. In other caches, if a tag compare fails on the main tag array, the control logic further initiates a check if there are earlier outstanding misses on the same cache line. In example embodiments, this check is not necessary in a streaming cache.

In one embodiment, an example of a graphics processing unit includes a controller configured to receive a first request for texel data for a first group of pixels; a first buffer to store one or more blocks of compressed texel data fetched, in response to the first request, from a first texture cache, the one or more blocks of compressed texel data including at least the requested texel data; a texture decompressor to decompress the one or more blocks of compressed texel data stored in the first buffer; and a second buffer to store the decompressed one or more blocks of compressed texel data and to provide the decompressed requested texel data as output to a second texture cache; wherein the one or more blocks of compressed texel data stored by the first buffer includes second texel data in addition to the requested texel data. In one embodiment, the first buffer may be a first FIFO buffer and the second buffer a second FIFO buffer. In one embodiment, one or more blocks of compressed texel data stored by the first buffer may include second texel data in addition to the requested texel data. In one embodiment, the controller may be configured to receive a second request for texel data for a second group of pixels, at least a portion of the one or more blocks of the first request corresponding to at least a portion of the second group of pixels; and the first buffer is configured to provide to the texture decompressor, in response to the second request, the portion of the one or more blocks without a second fetch from the first cache. In one embodiment, the controller may be configured to receive a second request for texel data for a second group of pixels, at least one texel of the second request corresponding to decompressed texel data stored in the second buffer from processing the first request; and the first buffer is configured to provide to the second texture cache, in response to the second request, the at least one texel of the second request without a second decompression from the first buffer. In one embodiment, a first texture cache may be configured to store non-power-of-two block sizes. In one embodiment, a second texture cache may be configured to store power-of-two block sizes. In one embodiment, a coalescer unit may be included to coalesce decompressed texture data prior to storage in the second texture cache. In one embodiment, first texture cache stores blocks sizes in accordance with the Adaptive Scalable Texture Compression (ASTC) codec. In one embodiment, the controller may control a first read pointer of the first buffer to select individual entries within the first buffer and a second read pointer of the second buffer to select individual entries within the second buffer.

In one embodiment, an example of a method of operating a graphics processing unit includes: receiving a first request for texel data for a first group of pixels; fetching requested compressed texel data from a first texture cache; buffering the fetched compressed texel data in a first buffer; providing an output of the first buffer to a texture decompressor and decompressing one or more blocks of the compressed texel data; buffering the decompressed texel data in a second buffer; and providing an output of the second buffer to a second texture cache; wherein the one or more blocks of compressed texel data stored by the first buffer includes second texel data in addition to the requested texel data. In one embodiment of a method, the first buffer is a first FIFO buffer and the second buffer is a second FIFO buffer. In one embodiment, the one or more blocks of compressed texel data stored by the first buffer includes second texel data in addition to the requested texel data. In one particular embodiment, a read pointer to the first buffer is selected to reuse texel data in the first buffer to service more than one request for texel data. In one embodiment, a read pointer to the second buffer is selected to reuse texel data in the second buffer to service more than one request for texel data. One embodiment includes reusing texel data in the first buffer, fetched for the first request, to at least in part service a second request for texel data for a second group of pixels without a second fetch from the first texture cache. In one embodiment, the first texture cache is configured to store non-power-of-two block sizes. In one embodiment, the second cache is configured to store power-of-two block sizes. One embodiment further includes coalescing decompressed texture data, received from the second buffer, prior to storage in the second cache. In one particular embodiment, texel data from a plurality of non-power of two blocks are coalesced.

In one embodiment, an example of a graphics processing unit includes: a first texture cache configured to store compressed texel data; a second texture cache configured to store texel data that has been decompressed from the first texture cache: and a controller configured to: receive requests for texel data for a group of pixels, and schedule accesses to the first or second texture caches for the texel data. In one embodiment, the controller is further configured to: determine whether there is a cache hit or a cache miss for the requested texel data in the second texture cache; access the first texture cache for the requested texel data in response to a determination of a cache miss; and access the second texture cache for the requested texel data in response to a determination of a cache hit. In one embodiment, the data is organized into the second texture cache based on locality patterns that are present in a set of accesses. In one embodiment, the second texture cache has texel data grouped into cache lines that are organized in Morton order that correspond to contiguous two-dimensional blocks of texels. In one embodiment, the controller is further configured to partition the set of texel addresses of the request into a sequence of at least one non-conflicting memory access. In one embodiment, the at least one non-conflicting memory access does not have tag conflicts or data bank conflicts. In one embodiment, the controller is further configured to combine texel requests that satisfy a set of constraints based on at least one of a number of distinct cache lines or a number of dwords per bank. In one embodiment, the controller is further configured to: find cache-line addresses required for the texel requests originating from each pixel of the group of pixels; and combine texel requests satisfying constraints of no more than four distinct cache lines and no more than one dword from each bank. In one embodiment, the second texture cache has 4-way banked tag lookup and 16-way banked data store. In one embodiment, the layout of texels in the second texture cache is selected to ensure that quad texels in a texel footprint are on distinct banks.

In one embodiment, an example of a method of operating a graphics processing unit includes: storing compressed texel data in a first texture cache; storing, in a second texture cache, texel data that has been decompressed from the first texture cache: receiving requests for texel data for a group of pixels, and scheduling accesses to the first or second texture caches for the texel data. In one embodiment, the scheduling includes: determining whether there is a cache hit or a cache miss for the requested texel data in the second texture cache; accessing the first texture cache for the requested texel data in response to a determination of a cache miss; and accessing the second texture cache for the requested texel data in response to a determination of a cache hit. One embodiment further includes organizing the texel data in the second texture cache into tiles within which cache lines are organized in Morton order such that a contiguous two-dimensional block of texels require less than a predefined number of distinct cache lines and tag-lookups. One embodiment further includes partitioning the set of texel addresses of the request into a set of non-conflicting sets of accesses. In one embodiment, the non-conflicting sets of accesses do not have tag conflicts or data bank conflicts. One embodiment further includes combining texel requests that satisfy a set of constraints for a number based on at least one of a number of distinct cache lines or a number of dwords per bank. In one embodiment, the combining texel requests includes combining texel requests satisfying constraints of no more than four distinct cache lines and no more than one dword from each bank. In one embodiment, the second texture cache has 4-way banked tag lookup and 16-way banked data store. In one embodiment, a layout of texels in the second texture cache is selected to ensure that quad texels in a texel footprint are on distinct banks. In one embodiment, data is organized into the second texture cache based on locality patterns that are present in a set of accesses.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. Embodiments may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A graphics processing unit comprising:
   a first texture cache configured to store compressed texel data;
   a second texture cache configured to store decompressed texel data that has been decompressed from the first texture cache: and
   a controller configured to:
      receive requests for texel data for a group of pixels, and
      schedule accesses to the first or second texture caches for the requested texel data,
   wherein the controller is further configured to combine texel requests that satisfy a set of constraints based on at least one of a number of distinct cache lines or a number of words per bank.

2. The graphics processing unit of claim 1, wherein the controller is further configured to:
   determine whether there is a cache hit or a cache miss for the requested texel data in the second texture cache;
   access the first texture cache for the requested texel data in response to a determination of a cache miss; and
   access the second texture cache for the requested texel data in response to a determination of a cache hit.

3. A graphics processing unit comprising:
   a first texture cache configured to store compressed texel data;
   a second texture cache configured to store decompressed texel data that has been decompressed from the first texture cache: and
   a controller configured to:
      receive requests for texel data for a group of pixels; and
      schedule accesses to the first or second texture caches for the requested texel data,
   wherein data is organized into the second texture cache based on spatial locality patterns that are associated with a set of accesses.

4. The graphics processing unit of claim 1, wherein the second texture cache has texel data grouped into cache lines that are organized in Morton order that correspond to contiguous two-dimensional blocks of texels.

5. The graphics processing unit of claim 1, wherein the controller is further configured to partition a set of texel addresses of the requests into a sequence of at least one non-conflicting memory access.

6. The graphics processing unit of claim 5, wherein the at least one non-conflicting memory access does not have tag conflicts or data bank conflicts.

7. The graphics processing unit of claim 1, wherein the controller is further configured to:

find cache-line addresses required for the texel requests originating from each pixel of the group of pixels; and combine texel requests satisfying constraints of no more than four distinct cache lines and no more than one dword from each bank.

8. The graphics processing unit of claim 1, wherein the second texture cache has 4-way banked tag lookup and 16-way banked data store.

9. The graphics process unit of claim 1, wherein a layout of texels in the second texture cache is selected to ensure that quad texels in a texel footprint are on distinct banks.

10. A method of operating a graphics processing unit comprising:

storing compressed texel data in a first texture cache;

storing, in a second texture cache, decompressed texel data that has been decompressed from the first texture cache;

receiving requests for texel data for a group of pixels;

scheduling accesses to the first or second texture caches for the requested texel data; and combining texel requests that satisfy a set of constraints for a number based on at least one of a number of distinct cache lines or a number of dwords per bank.

11. The method of claim 10, wherein the scheduling comprises:

determining whether there is a cache hit or a cache miss for the requested texel data in the second texture cache;

accessing the first texture cache for the requested texel data in response to a determination of a cache miss; and accessing the second texture cache for the requested texel data in response to a determination of a cache hit.

12. The method of claim 11, further comprising:

organizing the texel data in the second texture cache into tiles within which cache lines are organized in Morton order such that a contiguous two-dimensional block of texels require less than a predefined number of distinct cache lines and tag-lookups.

13. The method of claim 10, further comprising partitioning a set of texel addresses of the requests into a set of non-conflicting sets of accesses.

14. The method of claim 13, wherein the non-conflicting sets of accesses do not have tag conflicts or data bank conflicts.

15. The method of claim 10, wherein the combining texel requests comprises combining texel requests satisfying constraints of no more than four distinct cache lines and no more than one dword from each bank.

16. The method of claim 10, wherein the second texture cache has 4-way banked tag lookup and 16-way banked data store.

17. The method of claim 10, wherein a layout of texels in the second texture cache is selected to ensure that quad texels in a texel footprint are on distinct banks.

18. The method of claim 10, wherein data is organized into the second texture cache based on spatial locality patterns that are associated with a set of accesses.

* * * * *